March 24, 1970     G. BERNARD ET AL     3,502,978
MAGNETO-OPTICAL VOLTAGE MEASURING DEVICE UTILIZING
POLARIZED LIGHT
Filed March 10, 1967     2 Sheets-Sheet 1
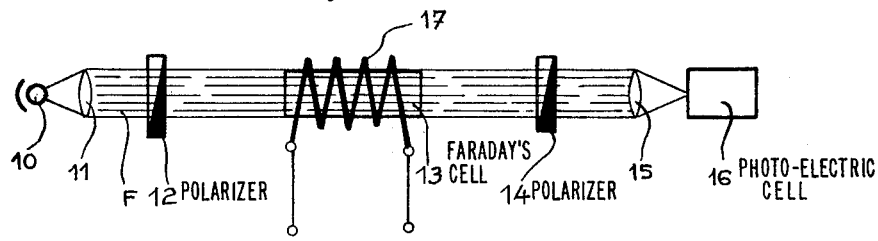
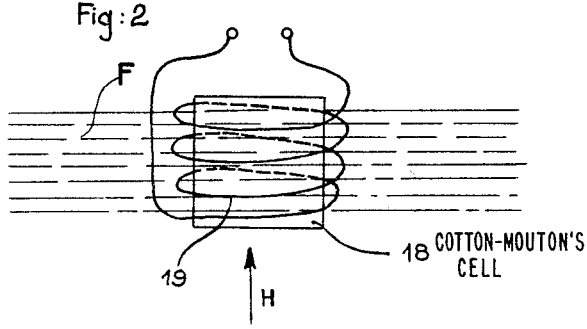
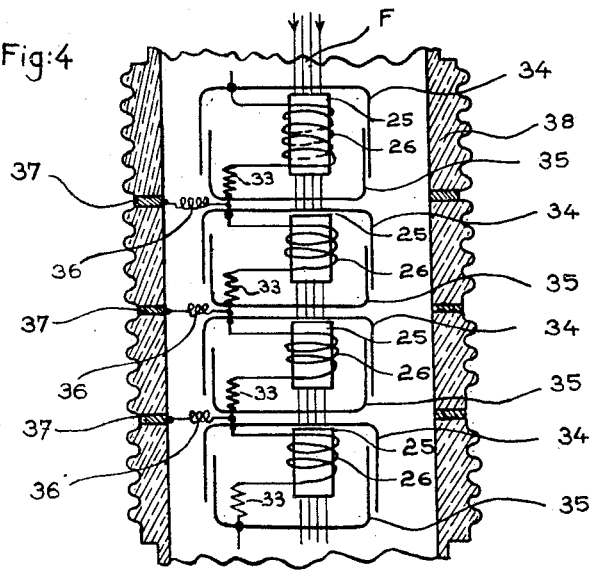
INVENTORS:
GEORGES BERNARD & YVES PELENC
Arthur Schwartz
ATTORNEY

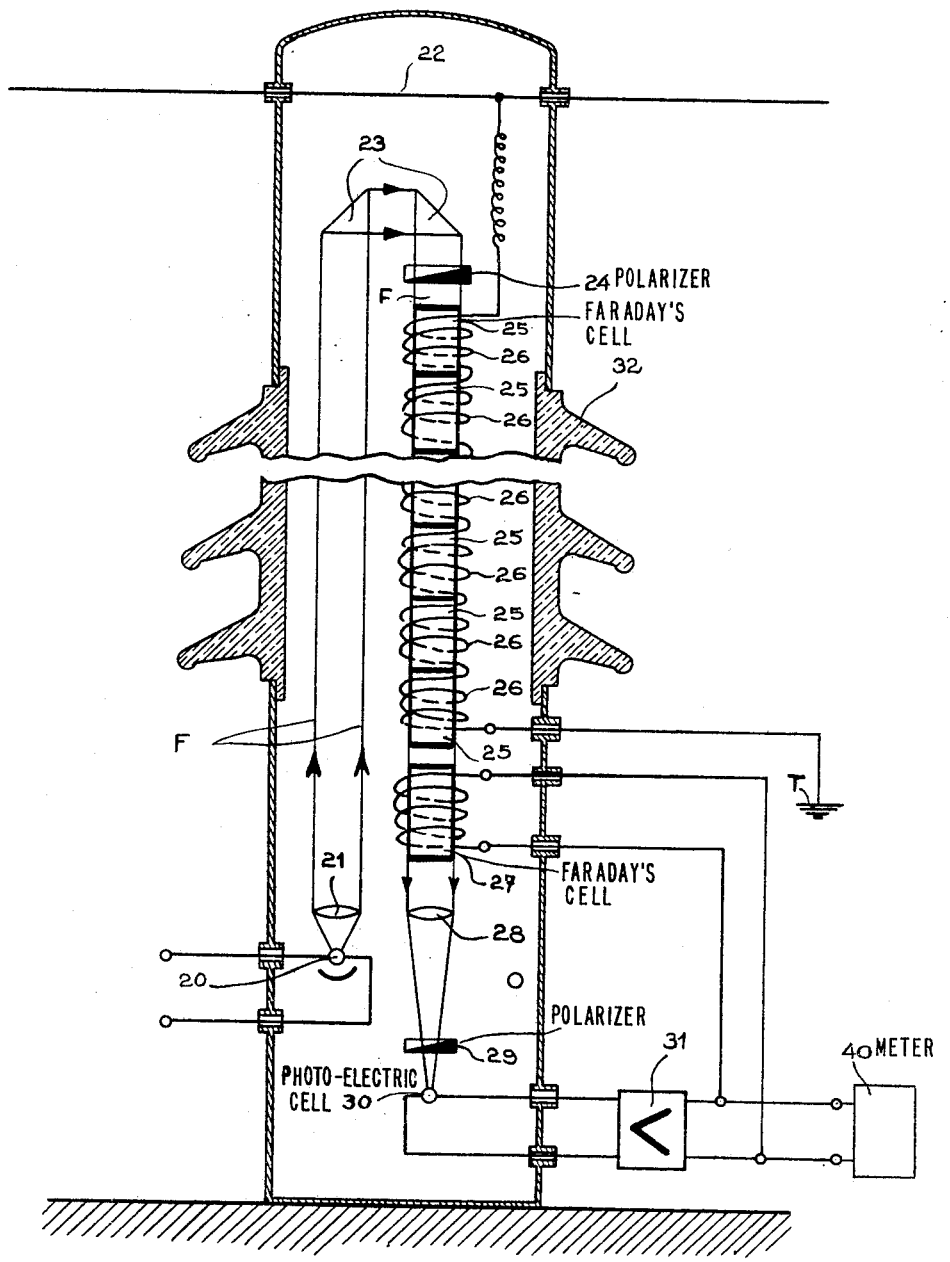

United States Patent Office 3,502,978
Patented Mar. 24, 1970

3,502,978
MAGNETO-OPTICAL VOLTAGE MEASURING
DEVICE UTILIZING POLARIZED LIGHT
Georges Bernard, St. Egreve, and Yves Pelenc, La
Tronche, France, assignors to Societe Anonyme dite:
Merlin Gerin, Grenoble, France
Filed Mar. 10, 1967, Ser. No. 622,276
Claims priority, application France, Mar. 16, 1966,
4,898
Int. Cl. G01r 31/00
U.S. Cl. 324—96
8 Claims

ABSTRACT OF THE DISCLOSURE

A voltage measuring device for the measurement of the voltage of an aerial high-voltage conductor. A polarized light beam traverses a magneto-optical device composed of a coil surrounding a medium capable of modifying the polarization of the light beam as a function of the magnetic field produced by the current flowing in the coil which is connected between the high-voltage conductor and earth. The modification of the polarization is measured.

---

In high-voltage networks, voltage step-down transformers and capacitive dividers are generally used to measure the voltage. These devices cause a number of difficulties relating to the insulation and to the potential distribution and require complicated measures to lower the corona point.

Moreover, the transient response of these instruments is poor and they do not allow measurements at low frequencies or for direct current.

It is an object of the invention to provide a voltage divider which does not present the above mentioned drawbacks.

It is known that a current can be measured by means of the polarization of a light beam by a magnetic field. Faraday has, indeed, discovered that certain transparent bodies, either liquid or solid, called Faraday's cells, if placed in a magnetic field, involve the rotation of the polarization plane of a light beam which traverses this body in a direction which is parallel to the direction of the magnetic field. The rotation is more pronounced for bodies such as flint glass, having a large refractive dispersion. The rotation of the polarization plane is proportional to the value of the magnetic field created by a current passing through a coil surrounding a Faraday's cell, thus permitting the measurement of this current by determining the rotation of the polarization plane.

FIG. 1 is a diagrammatic view illustrating the principle of a magnetic rotation of the plane of polarization, based on the Faraday effect.

FIG. 2 illustrates the principle of a magnetic rotary polarization based on the Cotton-Mouton effect.

FIG. 3 represents a schematic cross-section of apparatus according to the invention.

FIG. 4 illustrates certain improvements in the apparatus shown in FIG. 3.

FIG. 1 shows a diagram of a possible and known disposition, permitting the measurement of a current by means of a Faraday's cell. A source 10 produces a light beam F passing successively through an optical system 11, a polarizer 12, a Faraday's cell 13 formed by a heavy flint glass bar, a second polarizer or analyzer 14 and a second optical system 15, to reach finally a photo-electric cell 16. Through a coil 17, containing Faraday's cell 13, passes the current to be measured. The magnetic field formed by the current in the bar 13, causes the rotation of the polarization plane of the light beam and the electric output signal given by photo-electrical cell 16 may be used for the measurement of current in the coil 17.

In Faraday's cell 13, both the direction of the magnetic field and that of the light beam are parallel. The Faraday's cell can be replaced by a Cotton-Mouton's cell 18 (FIG. 2), containing a liquid rendered birefringent as a result of the application of the magnetic field H being perpendicular to the direction of the light beam F, and which is produced by a coil 19 through which passes the current to be measured.

According to the invention, these effects are used for the measurement of a high voltage. A current of intensity I passes through the coil around the cell and is given by the equation $U=ZI$, Z being the impedance of the coil and U the voltage applied to the coil.

The voltage can thus be measured indirectly by Faraday's (or Cotton-Mouton's) effect.

FIGS. 3 and 4 show two embodiments of the invention by way of illustrative examples. The Faraday effect has been used in both cases. However, according to the invention, each Faraday's cell may be replaced by a Cotton-Mouton's cell.

In FIG. 3 a source of light 20 produces a visible, infrared or ultra-violet radiation, and the word "light" is herein used to include all these radiations.

The source is preferably located near where the measure is performed, at a potential equal or near the ground potential. The light beam F, produced by source 20, passes through an optical system 21 directing it towards a conductor or feeder 22 of high or very high voltage $U_1$. An optical prism device 23 reflects the light beam F towards a polarizer 24 which may alternately be located between lens 21 and optical device 23.

The light beam F then passes through a certain number of superposed Faraday's cells 25 which are contiguous or not, and each of which is surrounded by a coil 26. All the coils 26 are electrically connected in series between the conductor 22 and the earth and their resistance has been appropriately chosen. An additional Faraday's compensating cell 27 has been inserted at the bottom of the column of cells 25, in the path of light beam F.

The latter passes first through the compensating cell 27 and then successively through an optical system 28 and an analyzer or second polarizer 29 to reach finally a photo-electric cell 30. The transparent medium of the cell 27 may be contiguous to the medium of the last cell 25 and eventually all the mediums of the cells may form a part of a same transparent bar. The electric output signal issued by photo-electric cell 30 is connected to the input of an electronic amplifier 31 and a measuring instrument 40 measures the value of the voltage $U_2$ at the output of the amplifier 31. This voltage $U_2$ is applied to the coil of the compensating cell 27. The electrical connection and the number of ampere-turns around cell 27 are such that the cell 27 tends at any moment to compensate the rotation of the polarization plane produced by all the cells 25 (respectively the total birefringence in the case of Cotton-Mouton's cells). Thus cell 27 produces automatically by a zero method a rotation of said polarization plane of equal value and opposite sign with respect to the resulting rotation produced by the assembly of cells 25. This device constitutes a real voltage divider having a secondary voltage equal to $U_1/K$, K being a constant.

The whole system is placed in a hollow insulator 32. According to the invention, cells 25 are distributed along the whole insulator joining the high voltage conductor 22 to earth, thus avoiding the consequences of a more or less variable and problematic voltage distribution throughout insulator 32. Such a distribution allows the measurement of $U_1$ by sampling and adding the magneto-optical effects occurring in each cell 25. Thus an exact measurement of the voltage may be obtained even if the voltage is not evenly distributed throughout the column.

Cells 25 may be spaced and the coils 26 may be mounted in series by means of voltage dividing impedances for instance by means of voltage dividing resistors 33 (FIG. 4). Each cell 25 may be located, together with its resistor 33, in an enclosure comprising bell-shaped electrodes 34 and 35, mounted in parallel with the coil and constituting electrostatic screens. Voltage connections 36 may be provided between electrodes 34, 35 and the metal armature 37 of insulator 38. The voltage distribution throughout the column may also be realized by condensers replacing the resistors 33. The coils 26 can also be shunted by means of additional condensers (not shown).

In order that the result be not affected by disturbances due, for instance, to variations in the light flux produced by the source (due to a prolonged use of the lamp, fluctuations in the supply voltage etc.), it may be useful to split the light beam proceeding from cell 27 into two polarized beams by means of semi-reflecting separator, illuminating respectively two photo-electric cells which form a part of a balanced compensating system. Further particulars concerning such a system are given in French Patent No. 1,439,260 and in the first patent of addition No. 51,961 to this patent.

What is claimed is:

1. A device for the measurement of the voltage of an aerial high-voltage conductor, comprising:
    (a) optical means arranged to create a polarized light beam, and to direct said polarized light beam from a point adjacent said high-voltage conductor to a point in a region of low voltage,
    (b) magneto-optical means including a medium traversed by said polarized light beam,
    (c) coil means electrically connected between said high-voltage conductor and a low potential point located in said region,
    (d) said coil means being arranged to create a magnetic field in said medium as a function of the voltage of said high-voltage conductor,
    (e) said medium modifying the polarization of said polarized light beam under the influence of and as a function of said magnetic field,
    (f) said medium and said coil means being arranged along a substantial part of the path followed by said polarized light beam between said high-voltage conductor and said low voltage region, and
    (g) detecting means to measure the degree of modification of the polarization of said light beam within said medium.

2. A device as set forth in claim 1 in which said low point is at earth potential.

3. A device for measuring the voltage of an aerial high-voltage conductor comprising:
    (a) means for generating a polarized light beam,
    (b) means for directing said polarized light beam between said high-voltage conductor and the earth,
    (c) a plurality of magneto-optical devices including a medium capable of modifying the polarization of said polarized light beam under the influence of and as a function of a magnetic field created by coil means,
    (d) said magneto-optical devices being spaced apart between said high-voltage conductor and the earth such that their media are successively traversed by said polarized light beam,
    (e) said coil means being electrically connected in series between said high-voltage conductor and a low-potential point, and
    (f) detecting means to measure the degree of modification of the polarization of said polarized light beam within said media.

4. A device as set forth in claim 3, further comprising a plurality of potential dividing impedances connected between the coil means of adjacent magneto-optical devices.

5. A device as set forth in claim 3, further comprising electrostatic screen means surrounding at least a part of said magneto-optical devices.

6. A device as set forth in claim 3, further comprising a plurality of aligned and superposed hollow insulators surrounding said magneto-optical devices, metallic junction elements being disposed between adjacent insulators, said junction elements being connected to said coil means of said magneto-optical devices.

7. A device as set forth in claim 3, wherein said detecting means comprise a further magneto-optical device having a medium capable of modifying the polarization of a light beam under the influence of and as a function of a magnetic field created by further coil means, said last named magneto-optical device being disposed to be traversed by the polarized light beam emerging from the last of said first named magneto-optical devices, means being provided to produce a current in said last named coil means so as to compensate by a null method the resulting modification of the polarization of said light beam caused by the summation of the partial modification of the polarization produced by said first named plurality of magneto-optical devices.

8. A device as set forth in claim 5, wherein said screens comprise a plurality of potential dividing condensers.

References Cited

UNITED STATES PATENTS 3,324,393  6/1967  Casey et al. _____ 324—96

RUDOLPH V. ROLINEC, Primary Examiner

C. F. ROBERTS, Assistant Examiner

U.S. Cl. X.R.

250—199, 225; 350—151